United States Patent [19]

Ando

[11] 4,443,806
[45] Apr. 17, 1984

[54] DATA RECORDING MEDIUM

[75] Inventor: Hideo Ando, Hino, Japan

[73] Assignee: Tokyo Shibaura Denki Kabushiki Kaisha, Kawasaki, Japan

[21] Appl. No.: 309,405

[22] Filed: Oct. 7, 1981

[30] Foreign Application Priority Data

| Oct. 9, 1980 [JP] | Japan | 55-141718 |
| Oct. 9, 1980 [JP] | Japan | 55-141721 |
| Oct. 9, 1980 [JP] | Japan | 55-141723 |
| Jan. 20, 1981 [JP] | Japan | 56-5874 |

[51] Int. Cl.³ .......................................... G01D 15/34
[52] U.S. Cl. .............................. 346/135.1; 346/76 L
[58] Field of Search ........................ 346/135.1, 76 L

[56] References Cited

U.S. PATENT DOCUMENTS

| 3,665,483 | 5/1972 | Becker et al. | 346/76 L X |
| 4,074,282 | 2/1978 | Balas, Jr. et al. | 346/135 |
| 4,264,911 | 4/1981 | Wilkinson | 346/135.1 |
| 4,282,534 | 8/1981 | Shinozaki et al. | 346/135.1 |
| 4,360,820 | 11/1982 | Forster et al. | 346/135.1 |

Primary Examiner—E. A. Goldberg
Assistant Examiner—Derek S. Jennings
Attorney, Agent, or Firm—Cushman, Darby & Cushman

[57] ABSTRACT

A data recording medium comprises a pair of disc-shaped substrates opposing each other at a distance; a radiation-sensitive recording layer formed on an opposing surface of each of the substrates; and a protective layer formed on each of the radiation-sensitive recording layers. Optical data may be recorded on the record or may be read out from this record by focusing a laser beam on the recording layer.

4 Claims, 10 Drawing Figures

DATA RECORDING MEDIUM

BACKGROUND OF THE INVENTION

The present invention relates to a data recording medium on which optical data may be recorded, for example, by focusing a laser beam on a radiation-sensitive recording layer to form a pit in the recording layer and from which the recorded optical data may be read out.

A conventional data recording medium of this type (to be referred to as a record for brevity hereinafter) is so constructed, as shown in FIG. 1, that transparent substrates 2 each having a radiation-sensitive recording layer 1 on the opposing surface thereof are bonded to each other through spacers 4 with a space 3 formed therebetween.

With this structure, parts of the recording layers 1 are exposed to the air within the space 3. When the record is transferred from a place at high temperature and high humidity to a place at low temperature, the air in the space 3 is rapidly cooled and condensate is attached to the recording layers 1. This degrades the recording layers at an early stage and also causes the problems of drop in sensitivity, an increase in noise, and so on.

SUMMARY OF THE INVENTION

It is an object of the present invention to provide a data recording medium with which degradation of the radiation-sensitive recording layers may be prevented and stable data processing may be performed over a long period of time.

It is another object of the present invention to provide a data recording medium with which the surface strength of transparent substrates is reinforced so that focusing of a laser beam on a recording layer may not be impaired.

It is still another object of the present invention to provide a data recording medium which has a great mechanical strength against flexure.

According to an aspect of the present invention, there is provided a data recording medium comprising:
a pair of disc-shaped substrates opposing each other at a distance;
a radiation-sensitive recording layer formed on an opposing surface of each of said substrates; and
a protective layer formed on each of said radiation-sensitive recording layers.

The data recording medium may further have a pair of coaxial ring-shaped spacers of different sizes sealed between the opposing surfaces of said disc-shaped substrates coaxially therewith and forming an annular space therebetween.

A reinforcing member may be disposed within the annular space so as to be slidable relative to the protective layer.

According to another aspect of the present invention, there is provided a data recording medium comprising:
a disc-shaped substrate;
a radiation-sensitive recording layer formed on one surface of said substrate;
an organic protective layer formed on said recording layer; and
an inorganic protective layer formed on said organic protective layer.

According to still another aspect of the present invention, there is provided a data recording medium comprising:
a disc-shaped substrate;
a radiation-sensitive recording layer formed on one surface of said substrate; and
an inorganic protective layer formed on the other surface of said substrate.

DETAILED DESCRIPTION OF THE PREFERRED EMBODIMENTS

Figure 1:
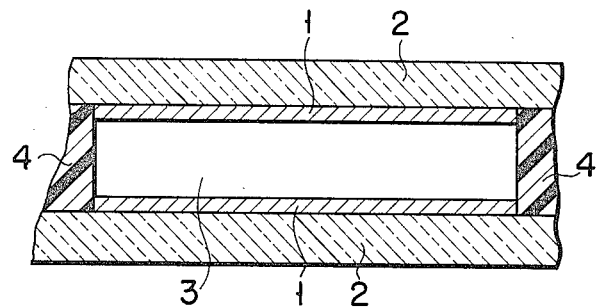
FIG. 1 is a sectional view of a conventional data recording medium.
Figure 2:
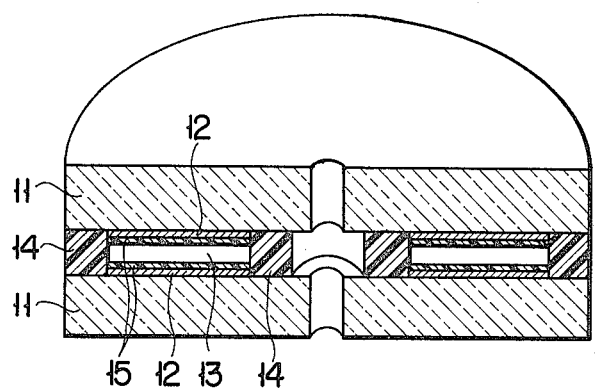
FIG. 2 is a sectional view of an embodiment of a data recording medium according to the present invention.

The preferred embodiment of the present invention of the data recording medium of the present invention will now be described with reference to FIG. 2. Referring to FIG. 2, reference numeral 11 denotes substrates which have a thickness of 1.5 mm and which consist of glass or transparent plastic material. A recording layer 12 is formed on one surface each of the substrates 11. The recording layers 12 consist of Te, for example and have a thickness of 500 Å.

The substrates 11 are bonded with spacers 14 interposed between in such a manner that the recording layers 12 may face inward and a space 13 may be formed between the opposing surfaces. Before bonding these substrates 11, a protective layer 15 of an organic material such as polystyrene or an inorganic material such as $SiO_2$ is formed on the surface of each of the recording layers 12 so that the recording layers 12 may not be exposed to the air inside the space 13 formed when the substrates 11 are bonded.

The protective layer has a thickness of 15 to 40 μm when an organic material is used and a thickness of 1,000 Å or more when an inorganic material is used.

Since the organic or inorganic protective layers 15 are formed on the surfaces of the recording layers 12, the recording layers 12 may not be oxidized by the air inside the space 13 and the water content of the air in the space 13 may not form condensate on these recording layers 12.

Figure 3:
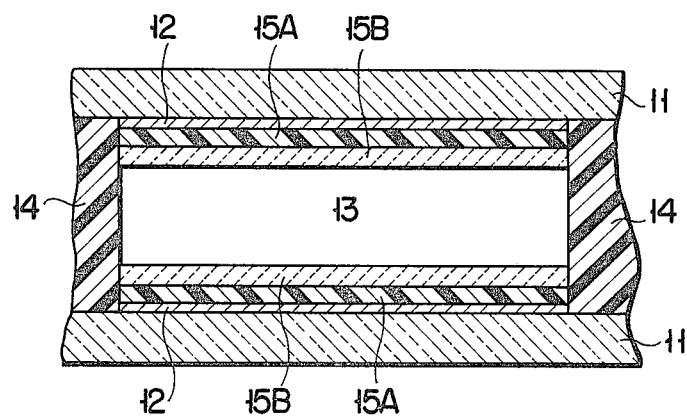
FIG. 3 is a sectional view of a modification of the data recording medium of FIG. 2.

In the embodiment shown in FIG. 2 described above, the protective layer 15 of either organic or inorganic material is used. However, the characteristics of the protective layer 15 may be further improved by adopting a bilayered structure as shown in FIG. 3 consisting of an organic layer 15A of polystyrene or the like and an inorganic protective layer 15B of $SiO_2$ or the like.

Although the organic protective layer 15A is made of a polystyrene resin in the above example, it may alternatively be made of acrylic resin, polyvinyl chloride resin, polyvinylidene chloride resin, polyester resin, methyl methacrylate resin, polyurethane resin, epoxy resin, melamine resin, or silicone resion.

Although the inorganic protective layer 15B is made of SiO$_2$ in the above example, it may alternatively be made of one of other metal oxides or nitrides such as SiO, Si$_3$N$_4$, or NESA film-forming material.

Figure 4:
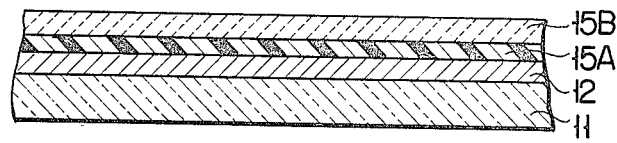
FIGS. 4 to 6 are sectional views showing other embodiments of a data recording medium according to the present invention.

FIG. 4 shows an embodiment of a data recording medium of the present invention which has a single transparent substrate.

Referring to FIG. 4, reference numeral 11 denotes a transparent plastic substrate of 1.2 mm thickness. Te is deposited on this transparent plastic substrate 11 to a thickness of 500 Å to form the recording layer 12. The organic protective layer 15A of polystyrene resin, is formed on the recording layer 12 to a thickness of 30 $\mu$m. The inorganic protective layer 15B of SiO$_2$ is formed thereover to a thickness of 2,000 Å.

When a focused layer beam is radiated on the recording layer 12, heat energy is transferred from the laser beam to the recording layer 12 so that the temperature of the recording layer 12 becomes high and part of the recording layer 12 at the center of the spot of the laser beam reaches the boiling point and evaporates. The surrounding part of the recording layer in liquid phase tends to collect toward the outside due to the surface tension and a pit is thus formed.

Te, the recording material, which has evaporated from the recording layer 12 is then trapped in the organic recording layer 15A which has a relatively low melting point and a low density and which allows permeation of the evaporated recording material easily. Below the organic protective layer 15A, Te in liquid phase collects to form a mass around the pit so that the sensitivity may not drop easily.

The inorganic protective layer 15B formed on the organic protective layer 15A prevents permeation of oxygen or water content. Thus, the inorganic protective layer 15B prevents the introduction of oxygen or water content to the recording layer 12 from the outside, guaranteeing a long service life.

Figure 5:
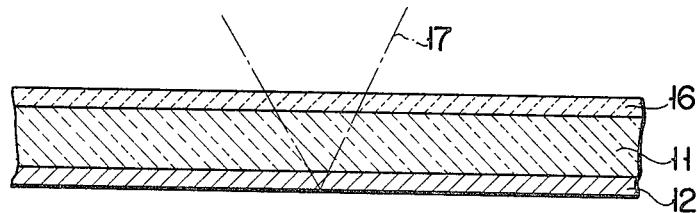

FIG. 5 shows another embodiment of a data recording medium of the present invention.

Referring to FIG. 5, the reference numeral 11 denotes a transparent plastic plate which prevents adverse affects of dust and which has a thickness of 0.1 to 2 mm, for example, 1.2 mm so as allow transmission of the laser beam through the focusing lens. The transparent plastic substrate may be made of polymethyl metacrylate or the like.

Te is deposited over one surface of the substrate to a thickness of 500 Å to form the recording layer 12. A protective layer 16 of an inorganic material, SiO$_2$ for example, is deposited to a thickness of 1,000 Å on the other surface of the substrate 11 on which the recording layer 12 is not formed.

A laser beam 17 is radiated on the record from the side of the protective layer 16. When the focused laser beam 17 is radiated on the recording layer 12, heat energy of the laser beam 17 is transferred to the recording layer 12 and the recording layer 12 becomes at a high temperature. The recording layer 12 at the center of the spot of the laser beam reaches the boiling point and evaporates. Furthermore, the surrounding part in liquid phase collects to the outside due to surface tension and a pit is thus formed.

The protective layer 16 of inorganic material formed on the substrate 11 has a great mechanical strength against scratching so that radiation of the laser beam 17 may not be impaired by surface irregular reflection. The protective layer 16 of organic material prevents permeation of oxygen molecules or water molecules since atoms of the inorganic material are aligned at a high density. Therefore, the degradation of the recording layer 12 at an early stage due to the oxidation of the radiated surface by the laser beam 17 or swelling of water is eliminated.

Figure 6:
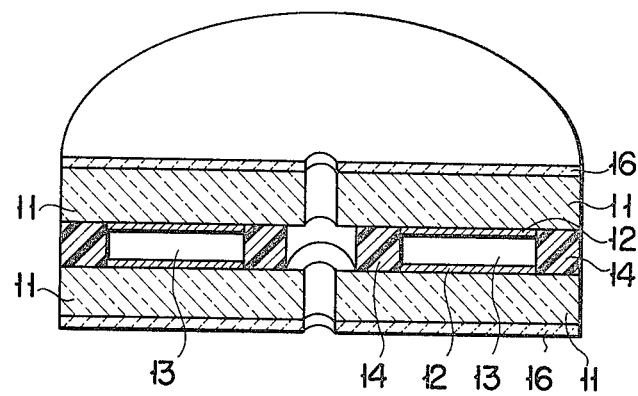

In the embodiment described with reference to FIG. 5, a description has been made with respect to a record in which the recording layer 12 is formed on one surface of a single substrate 11 and the protective layer 16 of inorganic material is formed on the other surface thereof. However, the present invention is not limited to this. For example, as shown in FIG. 6, the present invention also contemplates a record of the construction according to which a pair of substrates 11 each having a recording layer 12 on its opposing surface and a protective layer 16 on its other surface are opposed each other at a distance in such a manner to form the space 13 and the substrates 11 are bonded to each other through the spacers 14.

Figure 7:
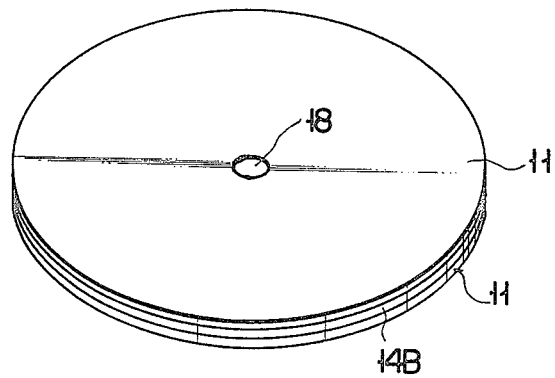
FIG. 7 is a perspective view of another embodiment of a data recording medium of the present invention.
Figure 8:
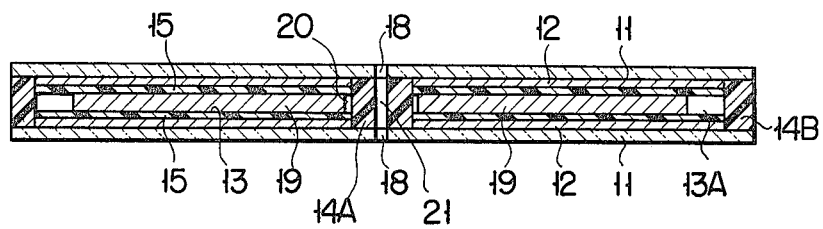
FIG. 8 is a sectional view of the data recording medium shown in FIG. 7.
Figure 9:
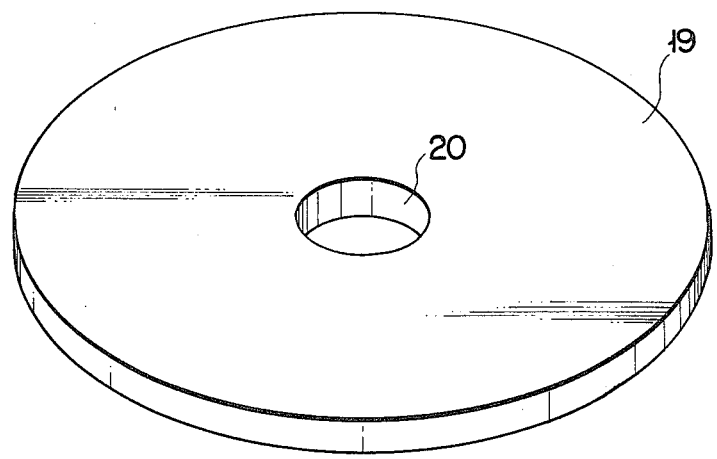
FIG. 9 is a perspective view of a reinforcing member used according to the present invention.

FIGS. 7 to 9 show another embodiment of the data recording medium of the present invention. The data recording medium of this embodiment has a pair of disc-shaped transparent substrates 11. Through holes 18 are formed at the centers of the transparent substrates 11. The recording layer 12 which has at its center a through hole (not shown) and is smaller in diameter than the substrates 11 is formed on the opposing surface of each of the transparent substrates 11. The protective layer 15 which covers the recording layer 12 and which has a through hole (not shown) at its center is formed on the surface of each of the recording layers 12. The space 13 is formed between both the protective layers 15. A reinforcing member 19 (FIG. 8), comprising a disc-shaped metal plate of aluminum, duralumin or the like, is disposed in the space 13. This reinforcing member 19 has a through hole 20 which has a diameter greater than the outer diameter of a ring-shaped inner spacer 14A. The outer diameter of the reinforcing member 19 is smaller than the inner diameter of a ring-shaped outer spacer 14B, thus defining a space 13A between the outer periphery of the reinforcing member 19 and the outer spacer 14B. This serves to prevent deformation which may otherwise be caused by the difference in the thermal expansion coefficients due to the temperature difference between the reinforcing member 19 and the transparent substrates 11. The inner spacer 14A having a through hole 21 at its center is adhered to the centers of the inner surfaces of the substrates 11 by a suitable means such as an adhesive so that the through hole 21 of the inner spacer 14A may communicate with the through holes 18 in the transparent substrates 11. The outer spacer 14B is attached to the inner surfaces at the outer peripheries of the transparent substrates 11 in the same manner as in the case of the inner spacer 14A.

The surface of the reinforcing member 19 is treated by the black zinc plating or the like so that light transmitted through the recording layers 12 may not be reflected by the surface of the reinforcing member 19. The reinforcing member 19 may be arranged to be slidable relative to the protective layers 15. In this manner, the difference in thermal expansion coefficients may not result in deformation.

Figure 10:
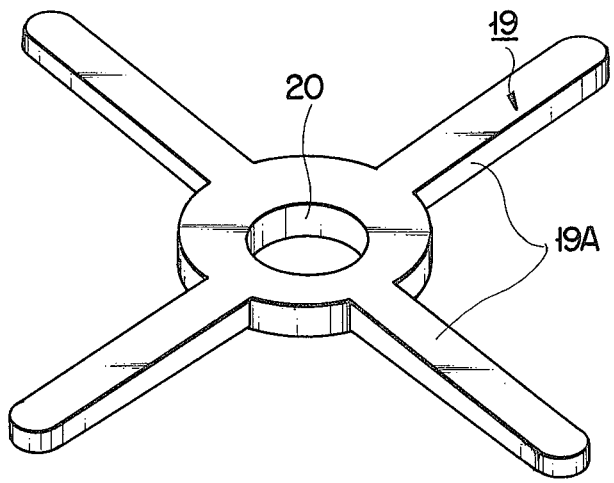
FIG. 10 is a perspective view of a modification of the reinforcing member.

FIG. 10 is a perspective view of another embodiment of the reinforcing member for use in the data recording medium of the present invention. This reinforcing member 19 has the through hole 20 extending through the inner spacer 14A and a plurality of support pieces 19A (four in the example shown in FIG. 10) which extend radially outwardly from the through hole. The material or mounting method of the reinforcing material are the same as for the reinforcing member 19 in FIG. 9 so that the detailed description thereof will be omitted.

With the record of the structure described above, since the reinforcing member 19 is present in the space 13, mechanical strength against flexure may be increased. Even when the record is left to stand obliquely, the record may not bend and the record may withstand storage over a long period of time.

The position of the reinforcing member 19 is not fixed in the horizontal direction. Therefore, deformation which may otherwise be caused by the difference in the thermal expansion coefficients due to the temperature difference may be prevented.

In FIGS. 2 to 10, the same reference numerals denote the same parts.

What is claimed is:

1. A data recording medium comprising:
   a pair of disc-shaped substrates;
   means for mounting said substrates opposing each other at a distance including a pair of coaxial, ring-shaped spacers of different sizes sealed between the opposing surfaces of said disc shaped substrates coaxially therewith and forming an annular space therebetween;
   a radiation-sensitive recording layer formed on an opposing surface of each of said substrates;
   an organic protective layer formed on said recording layer;
   an inorganic protective layer formed on said organic protective layer, and
   a reinforcing member arranged within said annular space so as to be slidable relative to said protective layer.

2. A data recording medium according to claim 1, wherein said reinforcing member is made of a metal.

3. A data recording medium according to claim 1, wherein a space is formed between said ring-shaped outer spacer and an outer periphery of said reinforcing member.

4. A data recording medium according to claim 1, wherein said substrates have a thickness of 0.1 mm to 2 mm.

* * * * *